United States Patent [19]

Aiken et al.

[11] Patent Number: 5,761,707
[45] Date of Patent: Jun. 2, 1998

[54] HIGH SPEED FLEXIBLE SLAVE INTERFACE FOR PARALLEL COMMON BUS TO LOCAL CACHE BUFFER

[75] Inventors: Steven W. Aiken, Pepperell; John A. Saba, Dracut, both of Mass.

[73] Assignee: Sun Microsystems, Inc., Mountain View, Calif.

[21] Appl. No.: 608,115

[22] Filed: Feb. 28, 1996

[51] Int. Cl.$^6$ ............................. G06F 12/00; G06F 13/00
[52] U.S. Cl. ............... 711/118; 364/DIG. 1; 364/243.4; 364/243.45; 364/231.8; 711/135; 711/141; 711/142
[58] Field of Search ..................... 395/445, 462, 395/468, 469; 364/DIG. 1, DIG. 2, 243.4, 243.45, 231.8; 711/118, 135, 141, 142, 143

[56] References Cited

U.S. PATENT DOCUMENTS

| | | | |
|---|---|---|---|
| 5,479,641 | 12/1995 | Nadir et al. | 711/118 |
| 5,551,006 | 8/1996 | Kulkarni | 711/135 |
| 5,581,727 | 12/1996 | Collins et al. | 711/135 |

*Primary Examiner*—Tod R. Swann
*Assistant Examiner*—Tuan V. Thai
*Attorney, Agent, or Firm*—Gary S. Williams; Flehr Hohbach Test Albritton & Herbert LLP

[57] ABSTRACT

An interface for transferring data via a PCI bus between a initiator device and a host target having a local cache buffer. The PCI interface to the local cache buffer includes an interface controller, an address resolution unit, data and address logic, byte enable logic and command processing logic. The command and data logics resolve address hits and misses and determine when a write operation will occur to the local cache buffer. The interface controller performs hand shaking operations between the PCI interface and an initiator device connected via the PCI bus. The interface controller also regulates the transfer of data between the device initiator and the local cache buffer, providing status and control signals to the cache controller during a given transfer cycle. The data logic receives the data from the PCI bus and verifies parity providing data and parity information to the cache buffer and cache parity error buffer. The byte enable logic receives and processes byte enable information associated with each data transfer phase and generates start pointer and end pointer information for a determination of the valid data bytes which are stored in a particular cache line. Finally, the interface controller generates an end of line signal upon the completion of a cache line write allowing for the transfer of uniform data blocks across the cache buffer to host boundary.

7 Claims, 11 Drawing Sheets

HIGH SPEED FLEXIBLE SLAVE INTERFACE FOR PARALLEL COMMON BUS TO LOCAL CACHE BUFFER

FIELD OF THE INVENTION

The present invention relates generally to systems and methods of transferring data between a host target and an initiator device via an interconnect, and more specifically to a method and apparatus for transferring data from an initiator device to a host target via a personal component interconnect (PCI) bus.

BACKGROUND OF THE INVENTION

The PCI bus is an industry standard bus which can be implemented as a 32 or 64 bit bus. The PCI bus standard allows for the reading and writing of data on a byte basis. In operation, once a device has been granted use of the PCI bus, it performs its bus transactions in two phases, an address phase and a data phase.

During the address phase, the bus master (initiator device) provides a data transfer command on a combined command, byte enable bus (C/BE bus) and an associated address for the transaction on a combined address and data bus (A/D bus). During the data phase, the A/D bus is used for the transmission of data while the C/BE bus contains byte enables associated with the data block transfer.

The implementation of the PCI bus is well known in the industry and its specifications are available to the public. In transferring data to and from a high speed industry standard common bus, often it is desirable to provide an intermediate local cache buffer for the data to allow the bus to maintain full bandwidth. However, problems arise when connecting such a flexible bus as the PCI bus to a local cache buffer.

Specifically, when making such a connection, it is desirable to maintain the PCI bus high speed while also allowing for byte write capabilities. In the PCI bus architecture, this is especially difficult given the fact that the state of the byte enables is not known until the first data phase begins. Moreover, the data phase can be delayed from the address phase by an unknown number of wait states initiated by either the host or target. In addition, in order to accommodate the byte write flexibility, host performance must suffer due to the non uniform data transfers.

A second problem arises in handling parity information for data transactions that are written to the local cache buffer. In the PCI bus specification, error checking is done via a single parity bit for 32 bit transactions and by two parity bits for 64 bit transactions. The state of the parity bit trails the data in this architecture by one clock cycle. The bus architecture requires a one clock cycle delay, however either the PCI bus initiator or the target can also insert additional wait states into any data phase bus transaction. Accordingly, the interface must stay connected for one clock cycle past the receipt of the last data cycle in order to receive this parity information. Those ordinarily skilled in the art will recognize that this extra cycle wastes bandwidth that could be better used beginning a new operation on the PCI bus.

Accordingly, it is the object of this present invention to provide an interface between a PCI bus controller and a local cache buffer which maintains the PCI bus high speed capabilities without sacrificing the flexibility the bus architects intended. Specifically, the interface allows for both 32 or 64 bit operation, various wait states and delayed parity protection as provided in the PCI bus standard. In addition, the interface allows for uniform block transfers of information to the host from the cache buffer upon the writing of an entire cache line.

SUMMARY OF THE INVENTION

The present invention is an interface for transferring data via a PCI bus between an initiator device and a host target having a local cache buffer. The PCI interface to the local cache buffer includes an interface controller, an address resolution unit, data and address logic, byte enable logic and command processing logic. The interface controller performs hand shaking operations between the PCI interface and an initiator device connected via the PCI bus. The command and data logic help resolve address hits and misses and determine when a write operation will occur to the local cache buffer. The interface controller regulates the transfer of data between the device initiator and the local cache buffer, providing status and control signals to the cache controller during a given transfer cycle. The data logic receives the data from the PCI bus and verifies parity providing data and parity information to the cache buffer and cache parity error buffer. The byte enable logic receives and processes byte enable information associated with each data transfer phase and generates start pointer and end pointer information for a determination of the valid data bytes which are stored in a particular cache line. Finally, the address resolution unit generates an end of line signal upon the completion of a cache line write allowing for the transfer of uniform data blocks across the cache buffer to host boundary.

BRIEF DESCRIPTION OF THE DRAWINGS

Additional objects and features of the invention will be more readily apparent from the following detailed description and appended claims when taken in conjunction with the drawings, in which:

DESCRIPTION OF THE EXEMPLARY EMBODIMENTS

Figure 1:
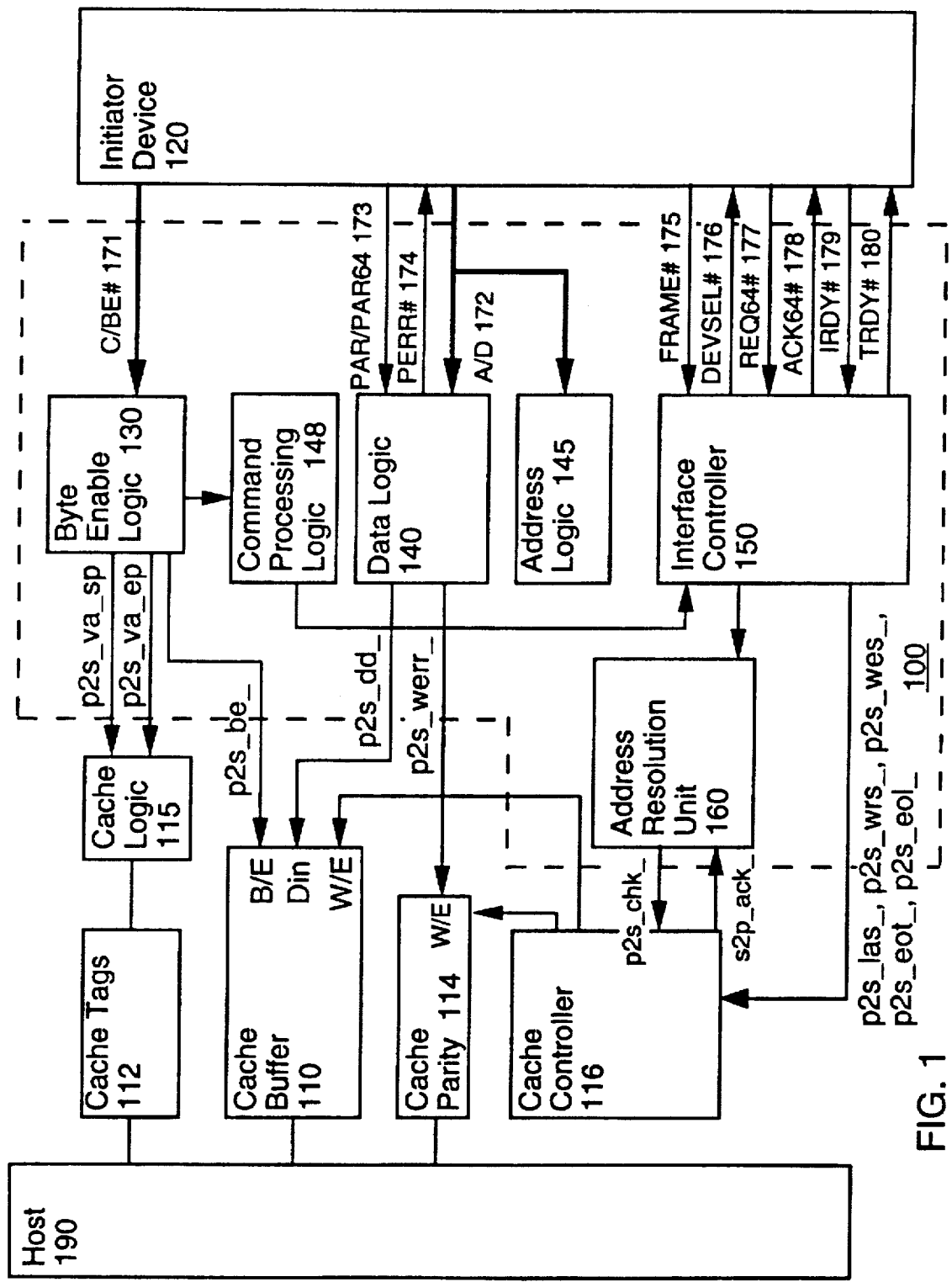
FIG. 1 is a block diagram of the interface system of the present invention.

Referring to FIG. 1, a block diagram of a PCI interface system 100 for transferring data between an initiator device 120 and a host 190 having a local cache buffer 110 is shown. The PCI interface 100 includes byte enable logic 130, data logic 140, address logic 145, command processing logic 148, an interface controller 150, and an address resolution unit 160. Associated with the local cache 110 are cache tags 112, cache parity error buffer 114, cache tag logic 115 and a cache controller 116, respectively.

The initiator device 120 is connected to the PCI interface system 100 by means of a PCI bus 170. The PCI bus 170 is comprised of the following signal lines: command and byte enable lines 171 (CIBE# [0:7]), address and data lines 172 (A/D 63:0), parity lines 173 (PAR/PAR64), a parity error line 174 (PERR#), frame indicator (FRAME#) and device selector (DEVSEL#) lines 175 and 176 respectively, 64 bit request (REQ64#) and acknowledge (ACK64#) lines 176 and 177, as well as initiator ready (IRDY#) and target ready (TRDY#) acknowledgment lines 179 and 180. Signals whose name ends in the "#" symbol are negative logic signals that are active when low.

The command/byte enable lines 171 are connected between the initiator device 120 and the byte enable logic 130. During the address phase of the PCI bus data transfer, the command/byte enable lines 171 contain command information associated with writes to the host via the PCI bus 170. During the data phase, the command/byte enable lines contain byte enable information associated with the data transfer. In 32 bit mode, the lower four bits of the byte enable data lines (3:0) are set depending on which of the four bytes in the 32 bit mode data transfer contain valid information. Conversely, in the 64 bit mode, all eight bits (7:0) are used to indicate which of the eight bytes in the upcoming data transfer cycle contain valid data. In the preferred embodiment, the byte enable data lines are active low.

The address/data lines 172 are connected between the initiator device 120 and the data and address logics 140 and 145 respectively. During the address phase, the address/data lines 172 contain 32 bits of address information. The address information is coupled to the cache logic 115 for resolving address hits associated with the cache buffer 110. During the data cycle, the address and data lines 172 transfer the four byte or eight byte data words into the data logic 140 for processing prior to writing in the cache buffer 110.

Parity/parity 64 data line 173 transmits parity error information associated with the data transfer. Parity information is transferred one clock cycle after the data cycle for data on the address/data bus 172. In 32 bit mode, the parity bit is included on PAR line 173. For 64 bit operation, a second parity bit is included on the PAR64 line 173. In response to the parity information, data logic 140 generates parity error information for transmission to the initiator device via the error lines 174.

The initiator device 120 is coupled to the interface controller 150 via FRAME# line 175, device selector (DEVSEL#) line 176, REQ64# line 177, and ACK64# line 178. The FRAME# line 175 is used by the initiator device to signal to the interface controller 150 that a data cycle is to commence, and that accordingly, valid address and command information is present on the address/data lines 172 and command/byte enable lines 171, respectively. The DEVSEL# line 176 operates to acknowledge the initiation of the data transfer responsive to the FRAME signal. The DEVSEL# line 176 operates to acknowledge the transaction initiated with the FRAME# signal. The DEVSEL# line is held low during the period of time in which the PCI interface system 100 is engaged in the transaction. The REQ64# line 177 is used to indicate by the initiator device that a 64 bit transmission mode is desired. The ACK64# line 178 is provided as an acknowledgment response back to the initiator that, in fact, 64 bit operation has been verified. Finally, the IRDY# and TRDY# lines 179 and 180 are used to indicate the initiator and target's readiness to transmit and receive data, respectively.

Figure 2:
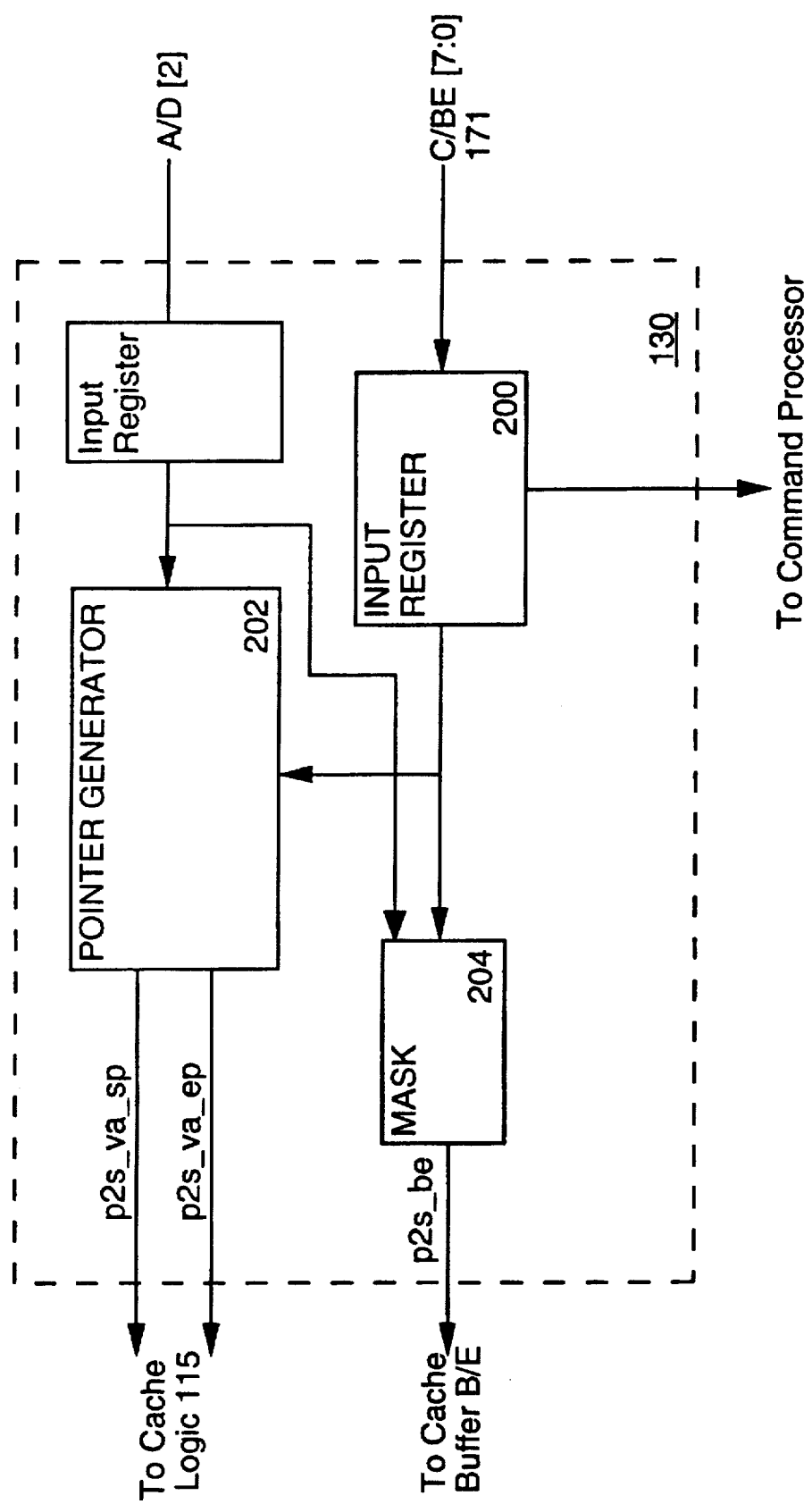
FIG. 2 is a block diagram of byte enable logic according to one embodiment of the present invention.

Referring now to FIG. 2, the byte enable logic 130 of the present invention is shown. The byte enable logic includes an input register 200, a pointer generator 202, and mask logic 204.

Input register 200 holds the command and byte enable information which is received via the command/byte enable bus 171 portion of the PCI bus 170. During the address cycle, the input register 200 receives the command information via the command/byte enable bus 171 from the initiator device 120. The command processing logic 148 reads the information stored in the input register 200 for determining whether or not to respond to the transaction. In one embodiment, the input buffer is comprised of eight one-bit registers, however, a single eight-bit register or other storage means may be utilized as is known in the art.

The command processing logic 148 decodes the command information to determine if a valid write command is indicated. It signals its determination to the interface controller 150.

During the data phase of a data transfer, the input register 200 receives byte enable information from the initiator device 120 via command/byte enable bus 171. The byte enable information is transferred from the input register 200 to mask register 204. The mask register 204 combines the byte enable information along with address bit [2] received during the address portion of the data cycle and generates a cache byte enable signal for transmission to the cache buffer 110. The cache byte enable signal (p2s_be_[7:0]) indicates which of the 8 bytes currently on the p2s_dd [63:0] bus should be written to the cache buffer. In the preferred embodiment, the cache lines are sized to be 64 bytes in length. Accordingly, 64 contiguous bytes of data relative to a given base address may be stored in a given cache line.

Pointer generator 202 snoops the transfer from the input buffer 200 to the mask register 204 in order to resolve a start pointer and end pointer associated with the data block transfer. In 32 bit mode, the lower four bits of the byte enable command/byte enable data lines 171 indicate which of the four data bytes presently being transferred from the initiator device contain valid data. Accordingly, for the first write cycle in a 32 bit mode write, the byte enables indicate which of the four bytes being transferred contained valid data. Thereafter, the byte enables are asserted until the last data cycle for the contiguous write operation. At the last data cycle, fly the byte enables for valid bytes of the four byte final data transfer would be asserted.

In 32 bit mode, the byte enable information coupled with address information (A/D [2]) stored by the data logic 140 is utilized to generate a start pointer. Specifically, the data logic 140 buffers and holds the value of address/data line A/D[2] received during the address phase and transfers the information to the pointer generator for use in deriving the start and end pointers.

During the initial data transfer cycle, the pointer generator evaluates the byte enable information received from the input buffer 200 to determine the first byte in the four byte transfer which contains valid information. This information is coupled with the address information A/D[2] resulting in the generation of a three bit output word (p2s_va_sp) associated with the start pointer for the data block transfer. The three bit output signal (p2s_va_sp) is transferred to cache logic 115 for processing.

In 64 bit mode, the pointer generator 202 evaluates the eight bits of the byte enable information associated with the current data transfer. The eight bits indicate which of the eight bytes transferred in the single data cycle contain valid data. In 64 bit mode the address information A/D[2] from the data logic is not required to generate the start pointer.

In 32 bit mode, the four bits of byte enable information associated with the four data bytes transferred with each data cycle will be asserted until the last data cycle. At the last data cycle, only the bits associated with valid data will be asserted by the initiator device. The pointer generator 202 will continue to monitor the byte enables received from the initiator device until the last data cycle. The pointer generator computes start and end pointers each cycle based on the byte enables and address as described above. The end of transfer is generated separately, and does not go to the pointer generator logic. If on the last data phase all bytes are valid, then p2s_vs_ep[2:0] will equal 7, which indicates the uppermost byte in p2s_dd[63:0] is valid.

The pointer generator will generate an end pointer signal (p2s_va_ep) to the cache logic 115 for processing based on the final byte enable information. Specifically, upon the completion of a data transfer, the byte enables transferred on the command/byte enable lines 171 will be stored in input register 200. The pointer generator 202 will read the byte enable information associated with this final data byte transfer and determine the last valid byte of data associated with the four byte (in 32 bit mode) or eight byte (64 bit mode) transfer. The pointer generator 202 resolves the last valid data location from the byte enable information and issues an end pointer signal (p2s_va_ep) to the cache logic 115. The p2s_va_ep end point signal is validated by the "end of transfer" signal p2s_eot which is generated independently by the interface controller 150.

The cache logic 115 utilizes the start pointer information (p2s_va_sp) associated with the first data transfer in a data block and the end pointer information (p2s_va_ep) associated with the last valid byte transferred in the data block and indicates to the cache tag logic the first and last byte of valid data associated with the cache line write.

Figure 3:
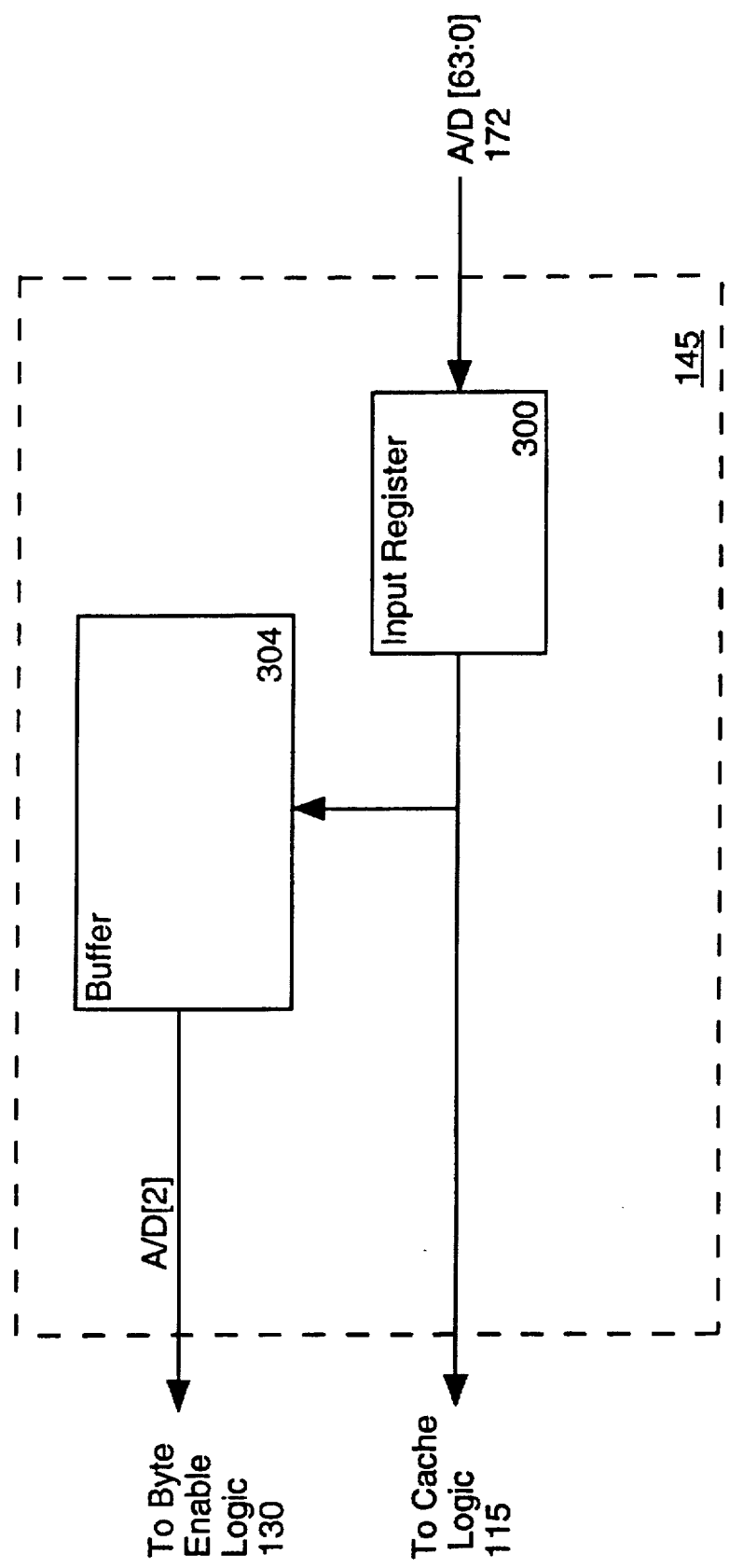
FIG. 3 is a block diagram of address logic according to one embodiment of the present invention.

The address logic 145 of the present invention is shown in FIG. 3. The address logic 145 includes an input register 300 and a buffer 304. During the address cycle of a data transfer, the address logic 145 reads in address information from the initiator device 120 into the input register 300 via the address/data bus 172. Buffer 304 is utilized to hold address information associated with address line A/D[2] which is utilized by the byte enable logic 130 during the data cycle. The address information stored in input register 300 is transferred to cache logic 115 during the address cycle.

Cache logic 115 determines cache hits and misses for a given address transferred from the address logic 145. Methods of determining such address hits by comparing the input address information with the address information stored in the cache tags 112 associated with the cache buffer 110 are known in the art. Other logic (not shown) determines hits in the hosts' main memory address space by similar methods. For the purposes of clarity, these methods will not be presented as part of this disclosure. The present invention is directed toward the interface between the cache buffer and the initiator device, and accordingly, a detailed discussion of the address resolution process is outside the scope of the present invention. Upon the resolution of a cache write, a write acknowledgment signal is transferred from the cache logic 115 to the interface controller 150.

Figure 4:
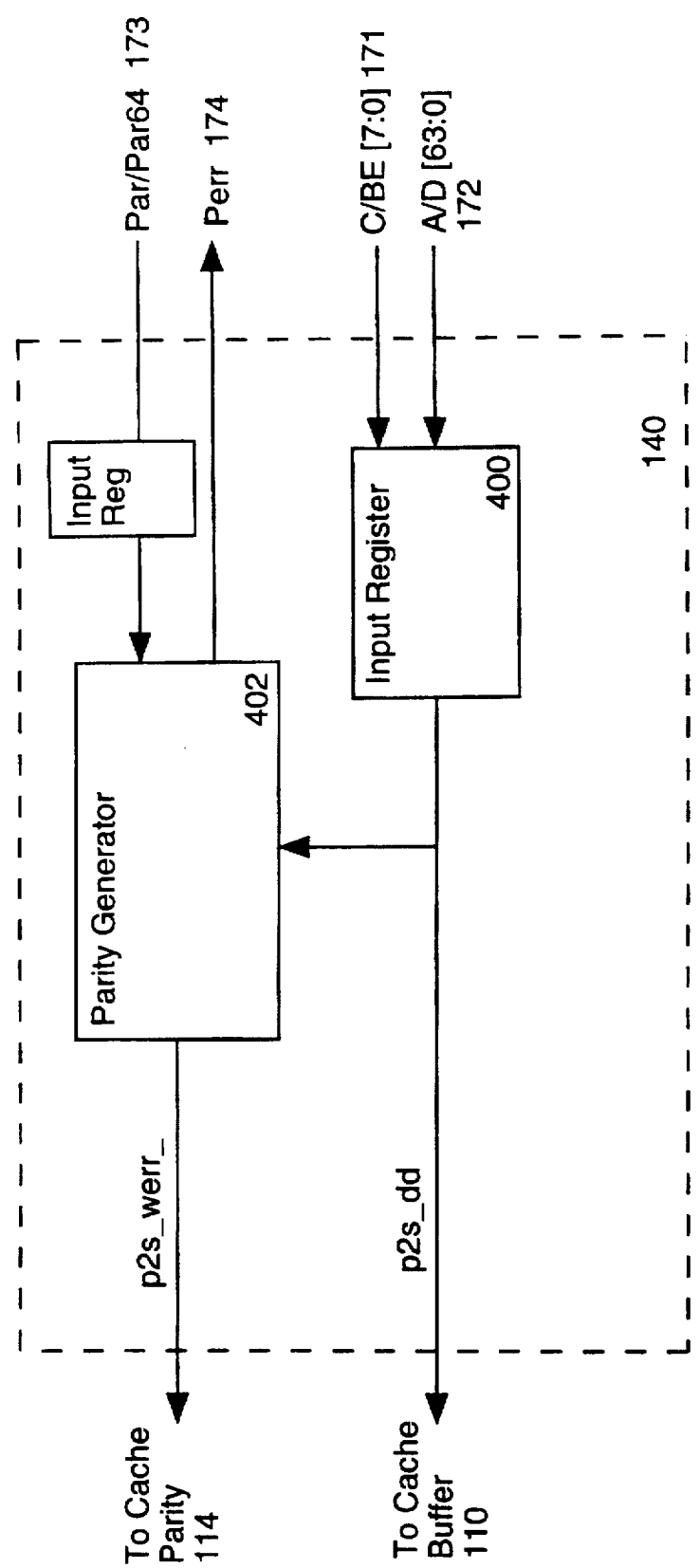
FIG. 4 is a block diagram of data logic according to one embodiment of the present invention.

Referring now to FIG. 4, data logic 140 according to one embodiment of the present invention is shown. The data logic 140 is comprised of an input register 400 and parity generator 402. Input register 400 receives data information during the data cycle from the initiator device 120 via the address and data lines 172. In the one embodiment, the input register is a 72 bit buffer which serves to buffer the input data and byte enables and synchronize the timing of transfers from the data logic to the cache buffer 110.

During the data cycle, parity generator 402 calculates parity of the data transferred from the input register 400 to the cache buffer 110. In addition, the parity generator 402 receives parity information via parity lines 173 from the initiator device 120. The parity generator 402 compares the derived parity information with the parity information received from the initiator device via the parity lines 173. The signal PAR contains parity information for A/D[31:0] and C/BE#[3:0], and the signal PAR64 contains parity information for A/D[63:32] and CIBE#[7:4]. In the event that a parity error occurs, parity generator 402 generates an error signal for transmission to both the cache parity error buffer 114 associated with the respective cache data line as well as an error signal back to the initiator device via PCI bus error line 174.

Figure 5A:
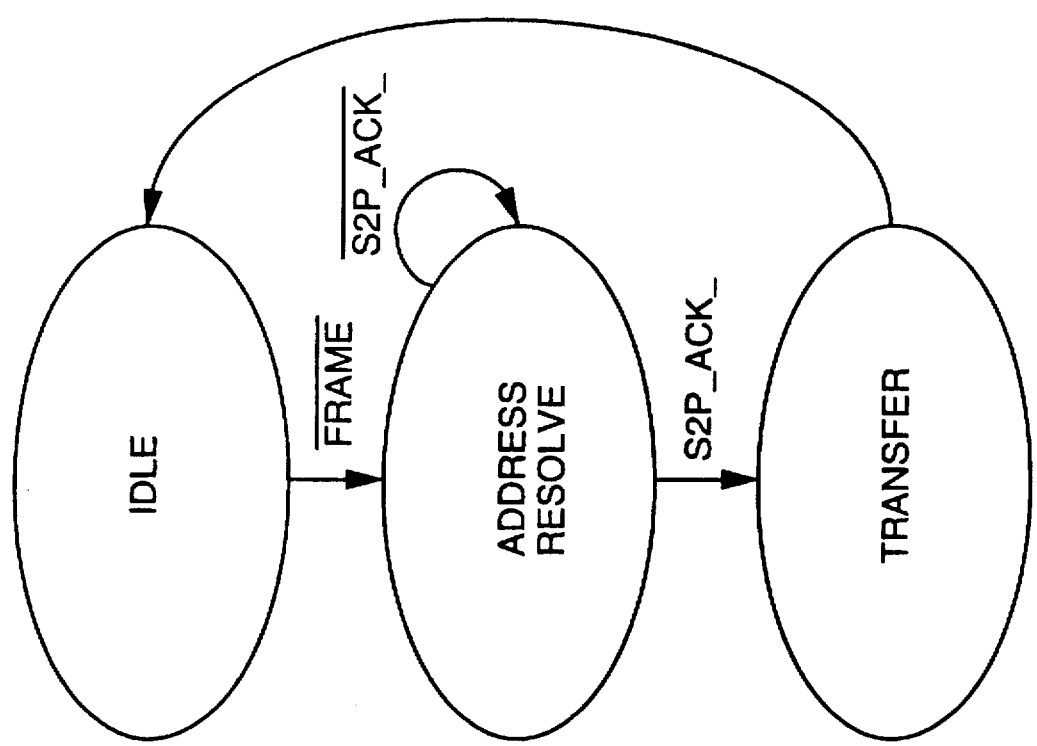
FIG. 5a is a state diagram for an address resolution unit according to one embodiment of the present invention.
Figure 5B:
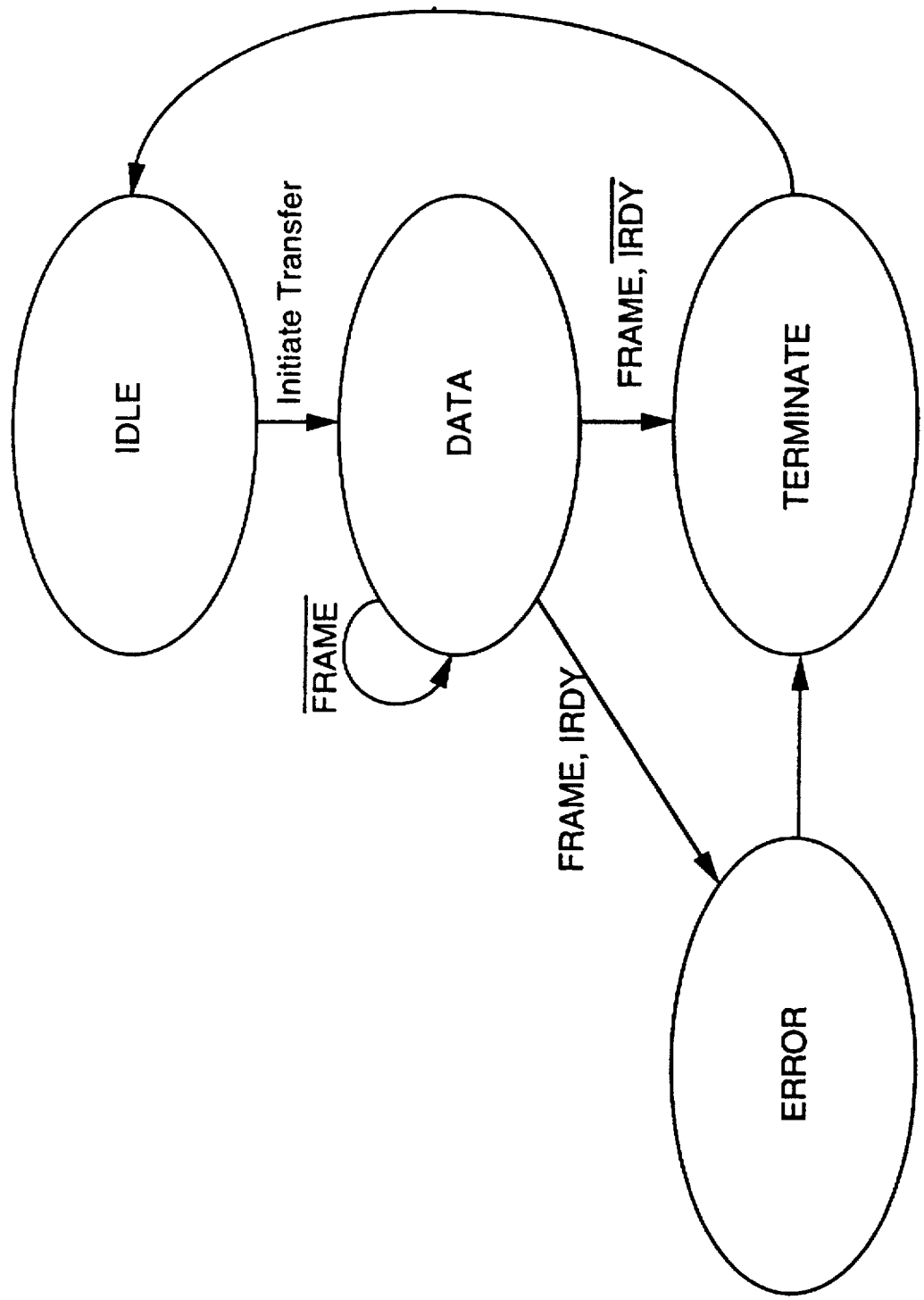
FIG. 5b is a state diagram for an interface controller according to one embodiment of the present invention.
Figure 5C:
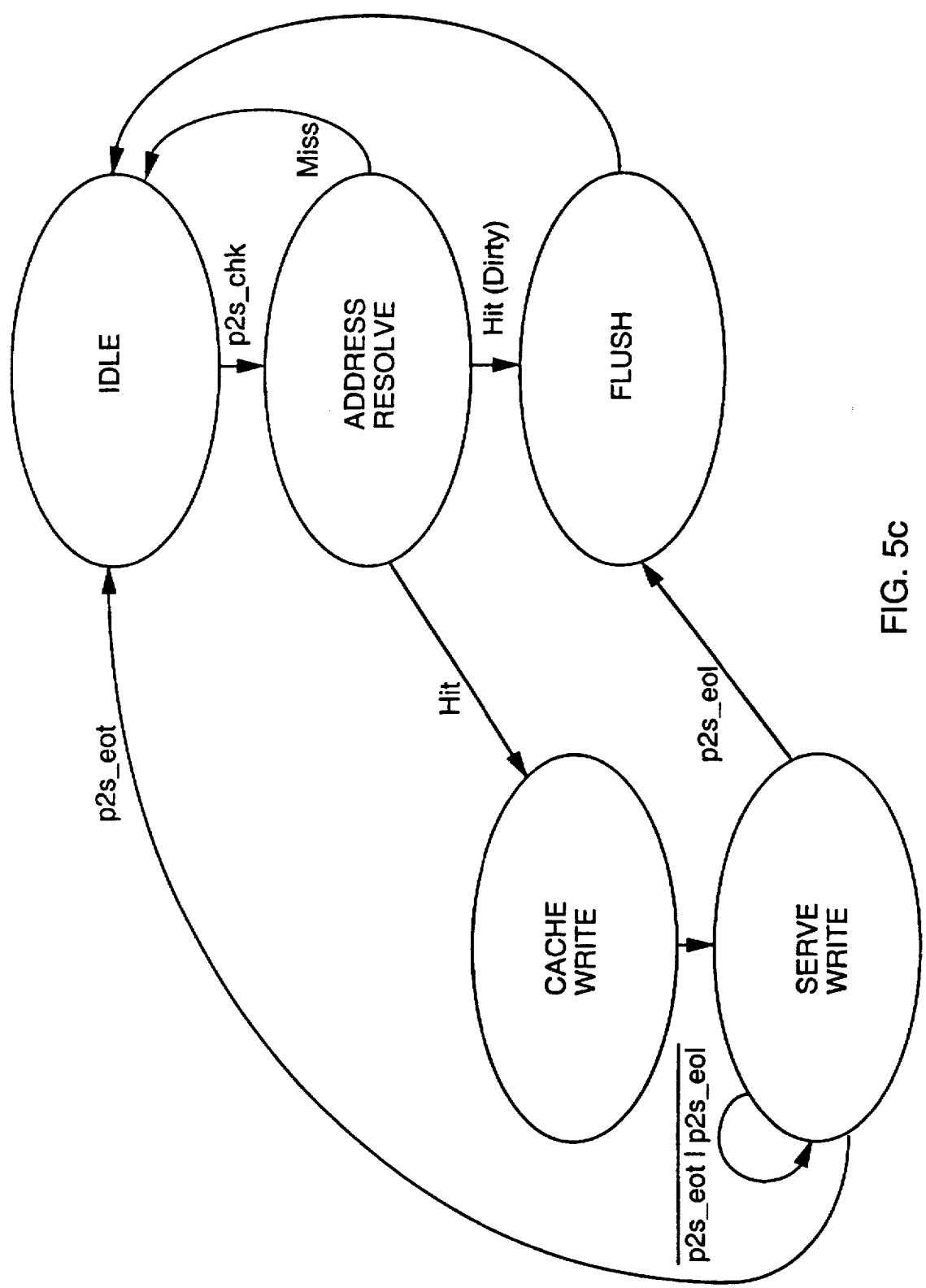
FIG. 5c is a state diagram for a cache controller according to one embodiment of the present invention.

FIGS. 5a, 5b and 5c show the state machine diagrams associated with the address resolution unit 160, interface controller 150, and cache controller 116.

Referring first to FIG. 5a, the address resolution unit (ARU) 160 sits in the IDLE state until it receives an initiation signal on the FRAME# signal line 175 indicating that the initiator device has asserted valid command and address information onto the PCI bus 170. Upon the assertion of the FRAME# signal, the ARU 160 transitions to the ADDRESS RESOLVE state, awaiting for the resolution of the command and address information by the host 190 and/or cache logic 115.

Once a valid address has been resolved and accepted by the cache controller 116, it will signal acknowledgment to the ARU 160 by asserting the s2p_ack_signal. The address resolution unit 160 will then proceed to the TRANSFER state and signal the interface controller to conduct the transfer on the PCI bus 170. Once cycle later the address resolution unit 160 returns to the IDLE state to await the beginning of the next PCI transaction.

Referring to FIG. 5b, the interface controller (IC) 150 stays in the IDLE state until it receives an initiation signal from the address resolution unit 160 indicating a cache write request from the initiator device 120. Upon receipt of this signal, the IC 150 transitions to the DATA state, where it remains until the initiator device signals the end of the transaction by deasserting FRAME# and asserting IRDY#. Upon this condition the IC 150 goes to the TERMINATE state for one clock cycle and then back to the IDLE state to await the next transaction. One other termination type occurs when the initiator device deasserts both FRAME# and IRDY# on the same clock edge. This illegal condition is handled safely by proceeding to the ERROR state and then the TERMINATE state and back to the IDLE state.

The IC 150 controls the transfer of data from the PCI initiator device to the local cache buffer via two sets of output signals. The PCI signals are DEVSEL# (176), ACK64# (178) and TRDY# (180). The local cache buffer interface signals are: p2s_las_, p2s_wrs_, p2s_eot_, p2s_eol_, p2s_wes_, p2s_werr_.

DEVSEL# is first asserted by the ARU 160 when it transfers from IDLE to the ADDRESS RESOLVE state. It is kept asserted by the IC 150 upon reception of the initiation signal. If the initiator requests a 64-bit wide transaction by asserting REQ64# along with FRAME#, then ACK64# is driven in an identical manner to DEVSEL#. When the IC 150 receives the initiation signal from the ARU 160 it asserts TRDY# to indicate its readiness to receive data from the PCI initiator. TRDY# remains asserted until the initiator device indicates an end of transfer by deasserting FRAME#.

P2s_las_, the line address strobe, is asserted whenever data is being transferred on the upper 32-bits of the p2s_dd bus or whenever the data being transferred on p2d_dd is the last data in the transaction. P2s_wrs_, the write strobe, is always asserted one clock cycle after both TRDY# and IRDY# are asserted.

The end-of transfer (p2s_eot_) or end-of-line (p2s_eol_) signals are asserted once per transaction, one cycle after FRAME# is deasserted with both IRDY# and TRDY# asserted. If the address of the last data in the transaction is within the upper 8 bytes of a 64 byte address range (known here as a "line"), the p2s_eol_signal is asserted; otherwise the p2s_eot_signal is asserted.

The write error strobe, p2s_wes_, mirrors p2s_wrs_, delayed by one clock cycle. The write error strobe, p2s_wes_, conditions the write error signal, p2s_werr_, which is asserted whenever incorrect parity is detected on the PCI bus. Note that for some cases, the write error strobe can be asserted after the end-of-transfer signal.

Referring now to FIG. 5c, a state diagram for the cache controller is shown. While the cache controller is part of the cache subsystem, and does not form a part of the interface of the present invention, the state diagram is presented in order to more clearly present the handshaking operation that occurs between the interface of the present invention and the cache subsystem. The cache controller 116 waits in an IDLE state until an address and command is received from the initiator device 120. Thereafter the cache controller 116 transitions into the ADDRESS RESOLVE state, waiting to see if a cache hit or miss will occur.

If a cache miss is detected (e.g. the memory space associated with the address request does not indicate a write to this cache), then the cache controller will transition back to the IDLE state.

If a cache hit is detected, then the cache controller will utilize the cache tag data to determine if the cache line to be accessed is dirty or clean. By dirty, it is meant that valid data is stored in the cache and the start pointer is not pointing to the next available byte. This requires data to be written back to memory before the cache entry can be used. If the cache line is dirty, then the cache controller 116 transitions to the FLUSH state, and the cache line is written back to the host main memory. If the cache line is not dirty, then the cache controller 116 transitions to the CACHE WRITE state. In the CACHE WRITE state, tag maintenance is performed by the cache controller in preparation for the cache write.

Upon the completion of the cache tag maintenance the cache controller 116 transitions to the SERVE WRITE state. In the SERVE WRITE state, writing to the cache buffer 110 is enabled on receipt of the cache write strobe and line address strobe. Upon receipt of the write error strobe from the data transfer controller, the cache controller will enable the cache parity buffer in order to receive the cache parity information. The cache controller will stay in the SERVE WRITE state until the receipt of either an end of transmission signal (p2s_eot) or an end of line signal (p2s_eol) from the data transfer controller. The end of transmission signal is generated responsive to the de-assertion of the FRAME signal as a result of an normal or error termination sequence. The end of line signal is generated by the data transfer controller to indicate an entire line of cache has been filled as a result of the current write process. Accordingly, the cache line may be flushed to main memory. If an end of line signal is received, the cache controller transitions to the FLUSH state to write this complete line to the host main memory. Conversely, if an end of transmission signal is received, then the cache controller transitions back to the IDLE state.

Figure 6:
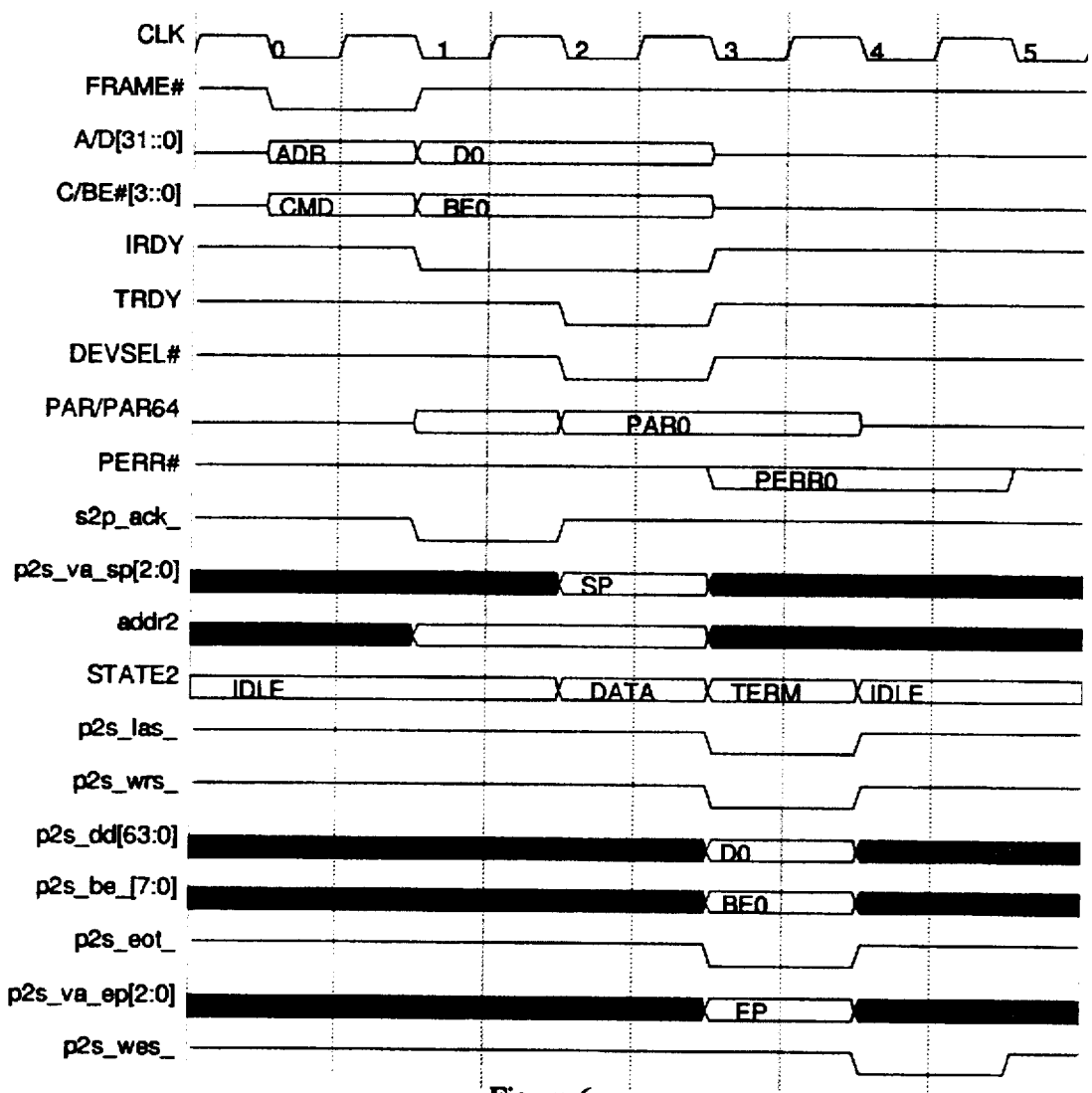
FIG. 6 is a timing diagram for a single data phase write operation.

FIG. 6 shows a 32-bit, single data phase write to any byte-aligned address. The initiator device 120 starts the transaction by asserting the FRAME# signal and while asserting command and address information on C/BE# and A/D respectively during cycle 0, and then deasserts FRAME#, asserts IRDY#, and drives the write data and byte enables in cycle 1. The PCI interface 100 presents the command address to be resolved by the host and local cache buffer as described above. The local cache controller signals it is ready for transfer with the s2p_ack_signal (shown here in cycle 1). In cycle 2 the PCI interface 100 is shown asserting DEVSEL# (it has from 1 to 4 cycles after FRAME# assertion to do this). Also in cycle 2 the PCI interface drives the start pointer value onto p2s_va_sp and the IC 150 asserts TRDY# and enters the DATA state. Data transfer across the interface occurs in cycle 3 with the IC 150 asserting p2s_las_, p2s_wrs_ and driving p2s_dd[31:0] and p2s_be[3:0] with values from A/D[31:0] and C/BE#[3:0] respectively. Since this is a single cycle transfer, end-of-transfer is signaled by asserting p2s_eot_ and driving the end pointer value onto p2s_va_ep. Once cycle after the data transfer, in cycle 4, p2s_wes_ strobes in the error value on p2s_werr_.

Figure 7:
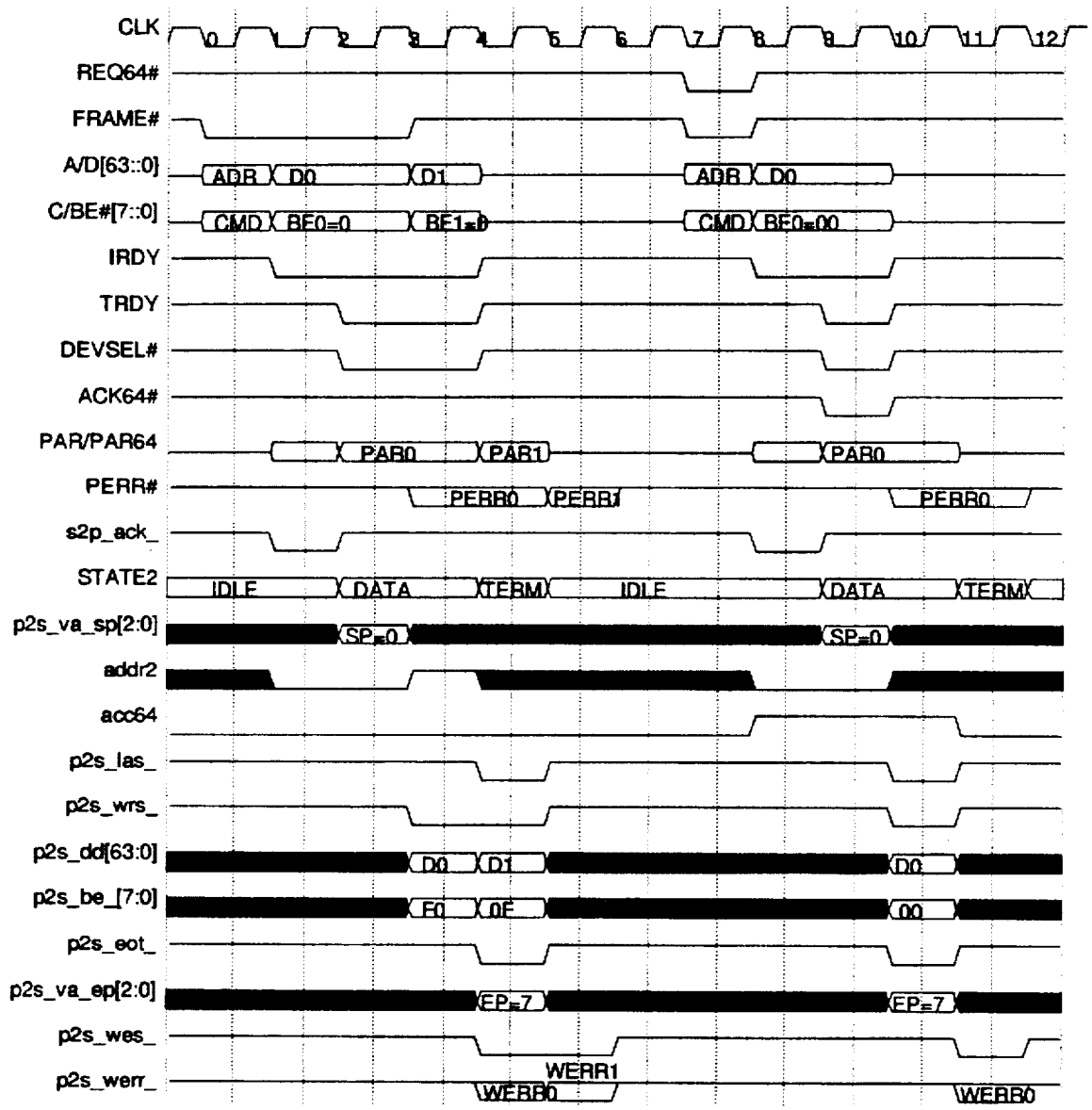
FIG. 7 is a timing diagram for an 8 byte write operation in 32 and 64 bit modes.

FIG. 7 is a timing diagram for an eight-byte write to an address aligned with an eight-byte boundary in 32-bit mode followed by the same access in 64-bit mode. The initiator device starts the address phase in cycle 0 and the first of two data phases in cycle 1. Also in cycle 1 the local cache controller signals that it has completed address resolution by asserting s2pk_ack_. In cycle 2 the IC 150 goes to the DATA state and asserts TRDY# to being the data transfer on the PCI bus. The start pointer is driven on p2s_vs_sp as well. During the following cycle, cycle 3, the IC 150 transfers the first data across the interface by asserting p2s_wrs_. Since this is a four-byte transfer on the lower half of p2s_dd, p2_las_ is not asserted at this time. P2s_dd[31:0] and p2s_be_[3:0] are driven in this cycle with the values from A/D[31:0] and CIBE#[3:0] in cycle 2, with p2s_be_[7:4] masked high. The second and final PCI bus data phase also occurs in cycle 3, indicated by both IRDY# and TRDY# being asserted and by FRAME# being deasserted. The second and final data transfer crosses the interface in cycle 4 and this time p2s_las_ is asserted since the data is in the upper half of p2s_dd. Specifically, p2s_dd[63:32] and p2s_be_[7:4] are driven in this cycle with values from A/D[31:0] and C/BE#[3:0] in cycle 3 and p2s_be_[3:0] is masked high. Since it is the final data transfer p2s_eot_ and p2s_va_ep are also driven. The write error strobe is asserted twice, in cycles 4 and 5, each time following p2s_wrs_ by one cycle.

The 64-bit transaction is started in cycle 7 by an address phase followed by one data phase. After the address is resolved in cycle 8, TRDY# is asserted in cycle 9 and the IC 150 goes to the DATA state. After the data transfer on the PCI bus in cycle 9, both p2s_las_ and p2s_wrs_ are asserted in cycle 10 with p2s_dd[63:0] and p2s_be_[7:0] being driven with values from A/D[63:0] and C/BE#[7:0] in the previous cycle. Also in cycle 9, p2s_eot_ and the end pointer on p2s_va_ep are driven, indicating that the first data phase is also the last. There is one cycle of p2s__wes__ assertion in cycle 11, which is again one cycle after the p2s__wrs__ assertion.

Figure 8:
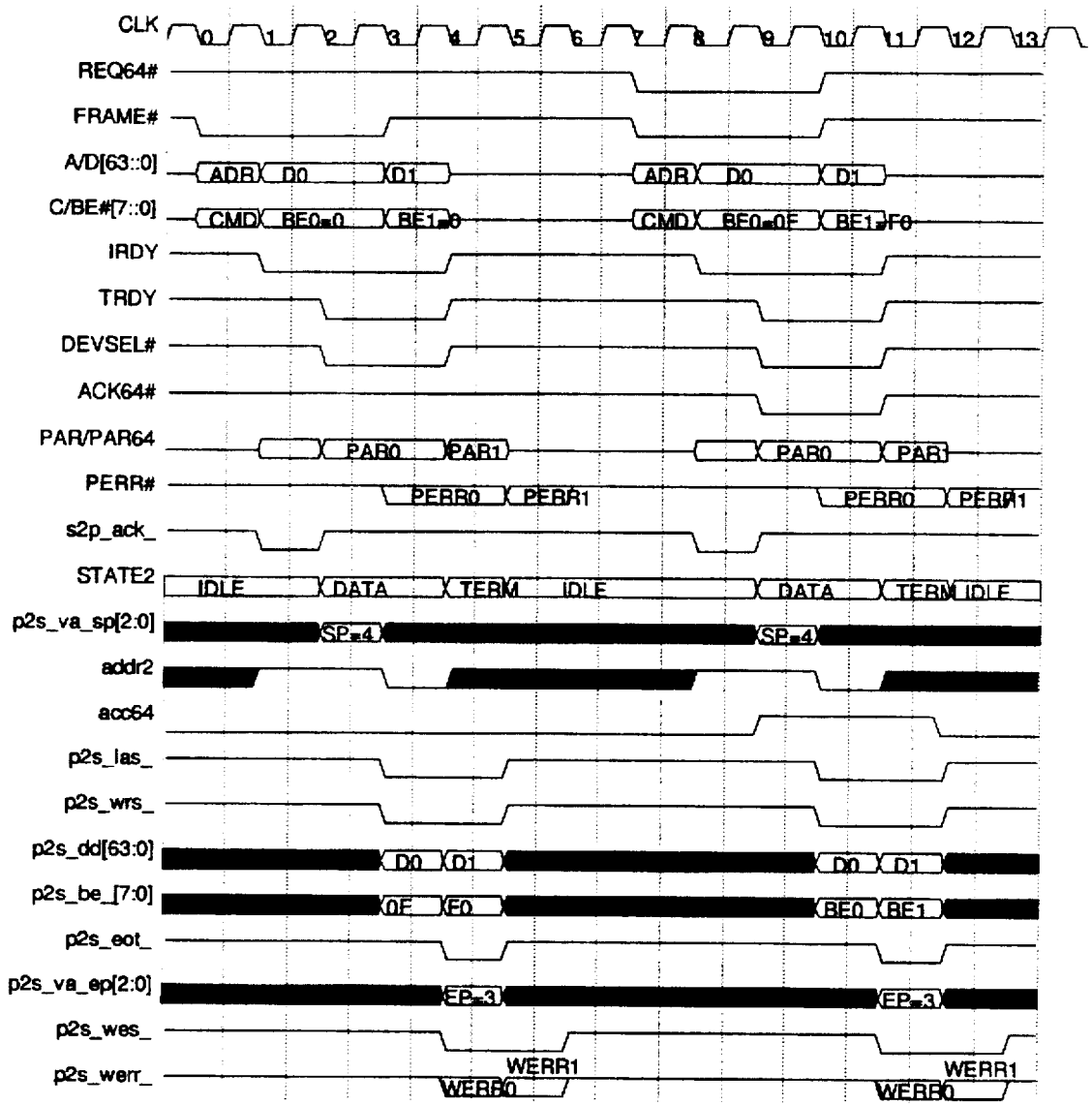
FIG. 8 is a timing diagram for an 8 byte write with an offset of 04h in 32 and 64 bit modes.

FIG. 8 is a timing diagram showing an eight-byte write to an address with an offset of 04h in 32-bit mode followed by the same transaction in 64-bit mode. The address phase occurs in cycle 0 and is followed by the first data phase beginning in cycle 1. In cycle 2 the start pointer is driven onto p2s__va__sp and in this case have a value of 04h. After the first data transfer on the PCI bus in cycle 2, data crosses the interface in cycle 3, signaled by the assertion of p2s__wrs__. P2s__dd[63:32] and p2s__be__[7:4] are driven with the values of A/D[31:0] and C/BE#[3:0] in cycle 2, with p2s__be__[3:0] masked high. Since the four-bytes of data are being transferred on the upper half of the data bus p2s__las__ is asserted to strobe the line address. For the second data transfer in cycle 4, p2s__dd[31:0] and p2s__be[3:0] are driven with the values of A/D[31:0] and C/BE#[3:0] in cycle 3 and p2s__be__[7:4] are masked high. P2s__las__ is again asserted, but this time due to the data phase being the last. P2s__eot__ and p2s__vs__ep are also driven in cycle 4. The write error and write error strobe signals are driven in cycles 4 and 5, one cycle after the write strobe assertions.

The address phase of the 64-bit transaction starts in cycle 7 followed by the first data phase in cycle 8. A valid start pointer, calculated solely from the byte enables, C/BE#[7:0], is driven on p2s__va__sp in cycle 9. The first four bytes of data cross the interface in cycle 10 with p2s__dd[63:32] and p2s__be__[7:0] driven with the values of A/D[63:32] and C/BE#[7:0] in cycle 9. The last four bytes of data cross the interface in cycle 11 with p2s__dd[31:0] and p2s__be__[7:0] driven with the values of A/D[31:0] and C/BE#[7:0] in cycle 10. P2s__las__ is driven in both cycle 10, because data is being transferred on the upper half of p2s__dd, and in cycle 11, because it is the final data phase of the transaction. P2s__eot__ and p2s__va__ep are driven in cycle 11. The write error and write error strobe signals are driven in cycles 11 and 12, one cycle after the write strobe assertions.

Figure 9:
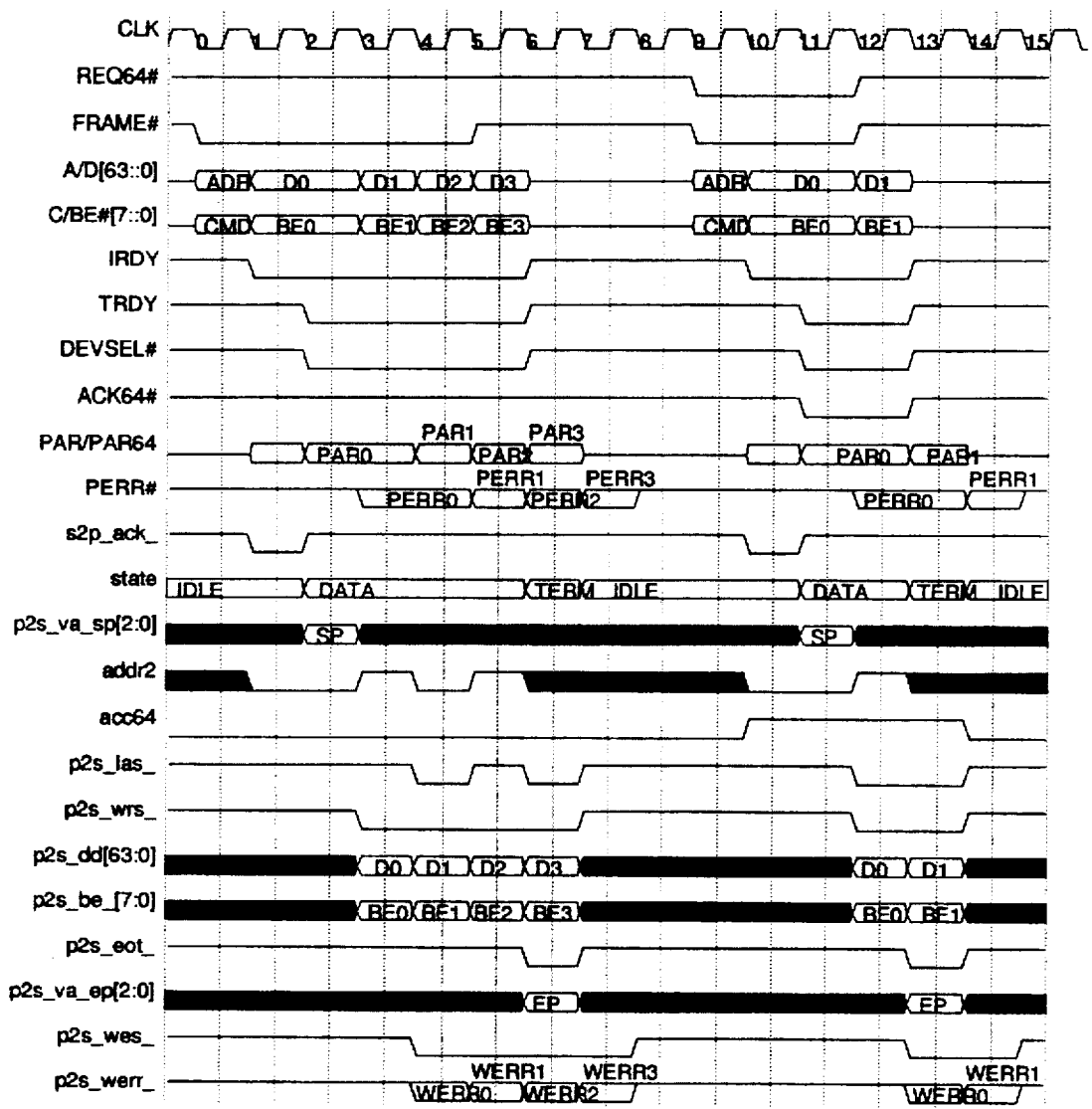
FIG. 9 is a timing diagram for a 16 byte write in 32 and 64 bit modes.

FIG. 9 shows a sixteen-byte write operation to an address with an offset of 00h in 32-bit mode, followed by the same access in 64-bit mode. The address and first data phases start in cycle 0 and 1, respectively, with data first crossing the interface in cycle 3. For the first and third data phases in cycles 3 and 5, p2s__dd[31:0] and p2s__be__[3:0] are driven with the values A/D[31:0] and C/BE#[3:0] in cycles 2 and 4, and p2s__be__[7:4] is masked high. For the second and fourth data phases in cycles 4 and 6, p2s__dd[63:32] and p2s__be__[7:4] are driven with the values of A/D[31:0] and C/BE#[3:0] in cycles 3 and 5, and p2s__be__[3:0] is masked high. P2s__las__ is asserted only for the second and fourth data phases as these occur in the upper half of 2sp__dd. The end of transfer occurs in cycle 6 with the assertion of p2s__eot__. The write error and write error strobe signals are driven from cycle 4 through cycle 7, delayed one cycle from the write strobe.

The 64-bit transaction starts in cycle 9 with the first data phase beginning in cycle 10. Data crosses the interface in cycle 12, with p2s__dd[63:0] and p2s__be__[7:0] driven with the values A/D[63:0] and C/BE#[7:0] in cycle 11. Both the line address strobe and write strobe are asserted for the first and second data phases in cycles 12 and 13 because data is being written on all 8 byte lanes on each clock cycle. The second data transfer is the last (cycle 13) and is signaled by p2s__eot__. The write error and write error strobe signals are driven in cycles 13 and 14, delayed one cycle from the write strobe.

While the present invention has been described with reference to a few specific embodiments, the description is illustrative of the invention and should not be construed as limiting the invention. Various modifications may occur to those ordinarily skilled in the art without departing from the true spirit and scope of the invention as defined by the pending claims.

What is claimed:

1. An interface for transferring byte level data between an initiator device and a host having a cache buffer, cache controller, and an associated main memory, said interface comprising:
    command processing logic for receiving and decoding write commands from said initiator device during an address cycle of a data transaction, each said write command have an associated address,
    data logic for receiving data [during a data cycle] associated with said address during a data cycle that is at least one clock cycle after the address cycle and for writing the received data to said cache buffer, the associated address and the received data both being received via a set of shared use address/data bus, and
    an interface controller for transmitting an acknowledgment signal back to said initiator device responsive to said decoded write command and said address, for initiating writing of the received data to the cache buffer at least one clock cycle after generation of said acknowledgment signal by said interface controller, and for transmitting an end of line signal to said cache controller upon reaching an end of a cache line during said writing of said cache buffer, said end of line signal initiating a cache line flush to said main memory of said entire cache line by said cache controller;
    wherein the interface controller releases the acknowledgment signal, so as to enable the initiator device to begin another data transfer, before the data logic finishes writing the data from the current data transfer to the cache buffer.

2. The interface of claim 1 wherein said data logic includes a parity generator that receives parity values from the initiator device at least one clock cycle after the data cycle, generates parity values for the received data and holds the generated parity value for the at least one clock cycle until corresponding parity values are received from the initiator device, compares the generated and received parity values, reports parity errors to said initiator device, and writes cache parity information to said cache buffer at least one clock cycle after said data is written to said cache buffer.

3. The interface of claim 1 further including byte enable logic for determining an offset in said cache line from said address where valid data bytes are stored.

4. The interface of claim 1, wherein the interface controller includes an interface controller state machine, including an first state corresponding to the address cycle of the data transaction, a second state that is entered a first variable number of cycles after the address cycle of the data transaction and in which the data logic receives the data associated with the address, and a third state that is entered a second variable number of cycles after the data cycle and in which the received data is transferred to the cache buffer; wherein the interface controller releases the acknowledgment signal at the end of the data state of the interface controller state machine so as to enable the initiator device to begin another data transfer before the data logic finishes writing the data from the current data transfer to the cache buffer.

5. A method of writing data from an initiator device via a standard bus to a host having a cache buffer and an associated main memory, said host cache buffer connected to said standard bus via an interface, the method comprising the steps of:

issuing a write command and an address associated with said main memory by said initiator device on said standard bus, a first variable number of clock cycles later, issuing data and byte enable information on said standard bus, resolving said write command and said address, and acknowledging back to said initiator device receipt of said write command, issuing a ready signal by said interface indicating that said interface is ready to read said data and byte enable information, reading said data and byte enable information from said bus, a second variable number of clock cycles later, writing said data to at a portion of a cache line of said cache buffer designated by said address and said byte enable information, signaling said cache controller when said writing data step reaches an end of said cache line during said writing of said cache buffer, and flushing said full cache line to said main memory;

wherein the first and second variable numbers of clock cycles are both at least one clock cycle and wherein the interface controller releases the ready signal so as to enable the initiator device to begin another data transfer before the writing step finishes writes data from the current data transfer to the cache buffer.

6. The method of claim 5, further including:

calculating parity of said data during said write to said cache buffer, transmitting parity information from said initiator device to said interface one clock cycle after said data is transferred, verifying said calculated parity information is equivalent to said parity information transmitted by said initiator device, and writing parity data at least one clock cycle after said data is written to said cache buffer.

7. The method of claim 5, further including:

determining an offset in said cache line from said address where valid data bytes are stored.

* * * * *